United States Patent [19]

Bott

[11] 3,780,806
[45] Dec. 25, 1973

[54] INVERTED MIXED LATEX FOR WATER FLOODING

[75] Inventor: Lawrence L. Bott, Oak Park, Ill.

[73] Assignee: Nalco Chemical Company, Chicago, Ill.

[22] Filed: Jan. 31, 1972

[21] Appl. No.: 222,302

[52] U.S. Cl.......... 166/275, 166/305 R, 252/8.55 D
[51] Int. Cl............................................. E21b 43/16
[58] Field of Search.................... 166/271, 275, 276, 166/278, 279, 300, 305; 252/8.55 D

[56] References Cited
UNITED STATES PATENTS

| | | | |
|---|---|---|---|
| 2,356,254 | 8/1944 | Blair, Jr. et al. | 166/305 R |
| 2,800,962 | 7/1957 | Garst | 252/8.55 D |
| 2,816,610 | 12/1957 | Fisher | 252/8.55 D |
| 2,851,105 | 9/1958 | Garst | 252/8.55 D |
| 2,958,665 | 11/1960 | Stefcik et al. | 252/8.55 D |
| 3,416,601 | 12/1968 | Young et al. | 166/276 |
| 3,540,532 | 11/1970 | Davis, Jr. et al. | 166/275 |

Primary Examiner—Marvin A. Champion
Assistant Examiner—Jack E. Ebel
Attorney—John G. Premo et al.

[57] ABSTRACT

An improved water flooding process for recovering oil from a subterranean oil-bearing formation which comprises introducing a stable liquid dispersion of a water-soluble anionic vinyl addition polymer and a water-soluble cationic polymer into an input well penetrating the formation. The dispersion comprises:

A. A polymeric latex composed of a water-in-oil emulsion which contains dispersed therein a finely divided water-soluble anionic vinyl addition polymer, said polymeric latex having uniformly distributed therethroughout; and B. A water-soluble cationic polymer;

with the weight ratio of A:B being within the range of 1:10 to 10:1 and the total amount of A+B present within said dispersion being within the range of from 0.001 percent to 75 percent by weight.

7 Claims, No Drawings

INVERTED MIXED LATEX FOR WATER FLOODING

This invention relates to the secondary recovery of petroleum from subterranean formations, and in particular concerns an improved water flooding process.

The technique of water flooding to recover oil from so-called "depleted" reservoirs is well known. It is described in detail in U. S. Pat. No. 2,827,964. In general, such process consists of introducing an aqueous medium into one or more injection wells which penetrate the "depleted" formation, and forcing such medium through the formation toward one or more production wells which likewise penetrate the formation. In the so-called "five-spot drive," the aqueous medium is forced down four injection wells which are more or less symetrically located around a producing well. As the flooding medium passes through the formation it displaces the residual oil therein and carries it into the producing well from which it is recovered by conventional means. In order to insure that the flooding medium advances through the formation to the production well with a more or less plane front (rather than in the form of fingers extending through the strata of highest permeability) it has been proposed that the viscosity of at least the forward portion of the flooding medium be adjusted so as to be of the order of, or greater than, that of the oil to be recovered. This has been accomplished by adding a viscosity-increasing agent to at least the initial portion of the flooding medium. Fatty acid soaps, alginates, sucrose, glycerine, carboxymethylcellulose and water-soluble polymers such as polyvinyl and polyallyl alcohols have been suggested for use as such agents in aqueous flooding media. Certain of such agents, however, precipitate from solution when exposed to typical reservoir temperatures and/or to the anionis or cations normally present in subterranean formations, whereas others must be employed in very large amounts to secure the desired increase in viscosity.

Other materials for increasing the viscosity of the flooding medium have been used. Specifically, water-soluble polymers have been dissolved to increase the viscosity of the flooding medium. For example, the water-soluble partially hydrolyzed acrylamide polymers have been in widespread use as well as the alkyl esters of acrylic and methacrylic acids, methacrylamide, styrene, vinyl acetate, acrylonitrile, methacrylonitrile, vinyl alkyl ethers, vinyl chloride, vinylidene chloride, etc.

Serous drawbacks have been experienced with these polymers in that they have quite slow dissolution times; some as long as one hour. Furthermore, as the flooding medium is forced further along in the formation, it tends to become diluted by water which is found throughout the formation. In addition, the viscosity-increasing additives tend to be lost through adsorpoion on the reservoir "rock" surface. As a result of this dilution, the blocking or plugging ability of the flooding medium is diminished until at some point in the formation the flooding medium has been so diluted that it no longer blocks the channels at all.

The present invention is based upon the discovery that a stable liquid dispersion of a water-soluble anionic vinyl addition polymer and a water-soluble cationic polymer can be injected into an input well which penetrates the formation, and forcing the water-in-oil emulsion through the formation toward at least one producing well penetrating the formation at a distance from the input well. This phenomenon is due to the fact that the stable liquid dispersion containing the water-soluble anionic vinyl addition polymer and water-soluble cationic polymer is capable of being inverted in water whereby the anionic vinyl addition polymer instantly reacts with the cationic polymer to produce a gel-like structure. This gel-like structure permeates throughout the subterranean formation.

The consequences of this procedure will cause increased produced oil-to-water ratios for a certain volume of water sent through the subterranean formation. Thus, the total amount of water needed to be sent through the formation will be reduced.

OBJECTS

It is an object of this invention to increase the oil-to-water ratio in the secondary recovery of oil from subterranean formations.

It is also an object of this invention to provide a stable liquid dispersion of a water-soluble anionic vinyl addition polymer and a water-soluble cationic polymer, which stable liquid dispersion is capable of being inverted in water whereby the anionic vinyl addition polymer instantly reacts with the cationic polymer to produce a gel-like structure for recovering petroleum from a subterranean oil-bearing formation.

Further objects will appear hereinafter.

THE INVENTION

This invention relates to a process for recovering oil from a subterranean oil-bearing formation which comprises introducing a stable liquid dispersion of a water-soluble anionic vinyl addition polymer and a water-soluble cationic polymer into an input well which penetrates the formation, and forcing the stable liquid dispersion through the formation toward at least one producing well penetrating the formation at a distance from the input well.

The stable liquid dispersion is characterized as capable of being inverted in water and the anionic vinyl addition polymer instantly reacts with the cationic polymer to produce a reaction product which may be described as a three-dimensional water and hydrocarbon liquid insoluble gel-like structure.

As mentioned above, the stable liquid dispersion is pumped into the input well. Once in the formation and upon contact with the water in the formation, the stable liquid dispersion is inverted and the polymers react as described above to form the gel-like structure. This structure is by nature oleophilic, and resists passage of aqueous fluids but promotes oil flow through the treated formation.

The stable liquid dispersion is generally used by diluting a dispersion concentrate with an organic liquid. The dispersion concentrate is a water-soluble anionic vinyl addition polymer in the form of a water-in-oil emulsion which contains dispersed therein the finely-divided water-soluble anionic vinyl addition polymer. This dispersion concentrate contains uniformly distributed there-throughout a water-soluble cationic polymer. The water-soluble anionic vinyl addition polymers that are used in the practice of the invention may be illustrated by the following list of polymers:

TABLE I

| Number | Name |
|---|---|
| 1 | Polyacrylic acid-sodium salt |

| | |
|---|---|
| 2 | Polymethacrylic acid-sodium salt |
| 3 | Maleic anhydride-vinyl acetate copolymer |
| 4 | Polyvinyl methyl ether-maleic anhydride copolymer |
| 5 | Methacrylic acid-acrylamide copolymer |
| 6 | Polyacrylic acid |
| 7 | Isopropenyl acetate-maleic anhydride sodium salt |
| 8 | Itaconic acid-vinyl acetate |
| 9 | Methyl styrene-maleic anhydride sodium salt |
| 10 | Styrene-maleic anhydride |
| 11 | Methylmethacrylate-maleic anhydride sodium salt |
| 12 | Acrylic acid-styrene |
| 13 | Acrylamide-acrylic acid (5% by weight) |
| 14 | Acrylamide-acrylic acid (50% by weight) |
| 15 | Polystyrene sulfonic acid |
| 16 | Acrylamide-acrylic acid (80% by weight) |

The above polymers may vary in molecular weight. They may be as low as 10,000 or as high as 12,000.000 or more. In many of the more useful applications, which will be more fully discussed hereafter, the molecular weight will be greater than 1,000,000.

The invention contemplates using as preferred water-soluble anionic vinyl addition polymers the homo- and copolymers of acrylic acid as well as the water-soluble salts thereof.

THE WATER-SOLUBLE CATIONIC POLYMERS

These polymers also may be selected from a wide variety of known polymeric materials. Several of these polymers are listed below in TABLE II.

TABLE II

| Number | Name |
|---|---|
| 1 | Ethylene dichloride-ammonia condensation polymers |
| 2 | Tetraethylene pentamine-epichlorohydrin condensation polymers |
| 3 | Epichlorohydrin-ammonia condensation polymers |
| 4 | Polyethylene imine |
| 5 | Ethylene diamine |
| 6 | Polydiallyl amine |
| 7 | Dimethylamino ethyl methacrylate |
| 8 | The methyl chloride quaternary of Number 1 |
| 9 | The benzol chloride quaternary of Number 7 |
| 10 | Guanidine formaldehyde condensation polymers |
| 11 | Acrylamide-diallylamine (30%) |

The above polymers are illustrative of typical water-soluble cationic polymeric materials that may be used in the practices of the invention. A preferred class of these polymers may be described as alkylene polyamines which are illustrated by polymers 1, 2, 3, 4, 5 and 8 above.

Many of the above polymers have been described with respect to the reactants from which they are prepared. A detailed discussion of the above polymers and other cationic polymers appears in Canadian Pat. No. 731,212, the disclosure of which is incorporated herein by reference. The polymers may be employed as solutions or in the form of a water-in-oil latex emulsion. When the polymers are of the vinyl addition type they may be copolymers of other ethylenically saturated monomers. Such copolymers should contain at least 5 percent by weight of the cationic monomer.

THE ANIONIC VINYL ADDITION POLYMER POLYMERIC LATEX

The invention contemplates utilizing the water-soluble anionic vinyl addition polymers in the form of water-in-oil emulsion which contains dispersed therein the water-soluble anionic vinyl addition polymer.

Emulsions of this type are prepared by dispersing the anionic vinyl addition polymer into a water-in-oil emulsion. These polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1 to 5 microns. After the powders have been comminuted, they may be dispersed into the water-in-oil emulsion by means of agitation provided by such devices as stirrers, shakers and the like. To be commercially practical, the amount of polymer in the emulsion should be at least 2 percent by weight. The invention contemplates using emulsions containing between 5 to 75 percent by weight with preferred emulsions having a polymer concentration within the range of 10 to 45 percent by weight. In some cases the starting emulsions are converted to suspensions due to the nature and the amount of the polymer present therein.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepare the polymer-containing emulsion of the water-soluble vinyl addition polymers directly from the vinyl monomers from which these polymers are synthesized. Such polymer-containing emulsions may be synthesized by using the water-in-oil emulsion polymerization technique set forth in U. S. Pat. No. 3,284,393. The teachings of this patent comprises forming a water-in-oil emulsion of water-soluble ethylenic unsaturated monomers. The emulsion is formed by utilizing a water-in-oil emulsifying agent. To this monomer is added a free radical-type polymerization catalyst and the heat is applied under free radical-forming conditions to form water-soluble polymer latices. The polymeric latices produced by this patent are relatively unstable and frequently must be treated with additional emulsifiers to render the products stable.

The water-in-oil emulsions used to prepare the above polymers may be formulated by any number of known techniques.

The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Company under the Tradename "ISOPAR M." Typical specifications of this narrow-cut isoparaffinic solvent are set forth below in TABLE III.

TABLE III

| Specification Properties | Minimum | Maximum | Test Method |
|---|---|---|---|
| Gravity, API at 60/60°F. | 48.0 | 51.0 | ASTM D 287 |
| Color, Saybolt | 30.0 | — | ASTM D 156 |
| Aniline Point, °F. | 185.0 | — | ASTM D 611 |
| Sulfer, ppm | — | 10.1 | ASTM D 1266 (Nephelometric mod.) |
| Distillation, °F. | | | ASTM D 86 |
| IBP | 400.0 | 410.0 | |
| Dry Point | | | |
| Flash point, °F. (Pensky-Martens closed cup) | 160.0 | — | ASTM D 93 |

The amount of oil used in relation to the water to prepare the emulsion may be varied over wide ranges. As a general rule, the amount of oil-to-water may vary between 5:1 to 1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil soluble emulsifying agent. The amount of emulsifying agent to provide an emulsion will have to be determined by routine experimentation. As a general rule it may be said that the amount of oil soluble emulsifier may range from 0.1 to 30 percent by weight based on the weight of the oil. To produce stable emulsions the amount of emulsifier will normally be within the range of 12 to 20 percent by weight of the oil.

Rather than provide a listing of suitable emulsifiers, recommended as being satisfactory are the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, we have found that certain high HLB surfactants are capable of producing stable water-in-oil emulsions. A typical low HLB emulsifier is sorbitan monooleate.

PREPRATION OF THE DISPERSION CONCENTRATE

Once the latices containing the water-soluble anionic vinyl addition polymers are prepared, the dispersion concentrate is prepared by combining them with the water-soluble cationic polymers by the utilization of conventional mixing techniques. Preferably, the water-soluble cationic polymers are in the form of aqueous solutions which contain 5 to 40 percent by weight of the polymer and are added to the polymeric latex. Alternatively, they may be nearly water-free. After uniformly mixing the two components there results a dispersion concentrate of a water-soluble anionic vinyl addition polymer and a water-soluble cationic polymer. The proportions of the two polymers may be varied to a considerable degree. For instance, the ratio of the water-soluble anionic vinyl addition polymer to water-soluble cationic polymer may vary between 1:10 to 10:1 on a weight basis. A preferred ratio is 1:5 to 5:1. The most preferred ratio is 1:2 to 2:1.

The amount of the water-soluble vinyl addition polymers plus the water-soluble cationic polymers present in the finished dispersion concentrate may be varied over a wide range of concentrations, e.g., dispersion concentrates containing from 0.001 percent to 75 percent by weight are useful, although for most applications the total weight of the two polymers contained in the dispersion concentrate will be within the range of 5 percent to 40 percent by weight, with a very beneficial dispersion being one which contains between 10 to 30 percent by weight of the two polymers.

The finished dispersion concentrates are stable at room temperature for periods of time ranging between several days to as long as six months since they may be prepared over a wide variety of concentrations. Dispersion concentrates containing large amounts of polymers may be prepared and shipped to a use point and then diluted with an organic liquid just prior to use.

To illustrate the preparation of dispersion concentrates, a variety of emulsions were prepared containing different water soluble anionic vinyl addition polymers. These emulsions are set forth below in TABLE IV.

TABLE IV

| Composition Number | Percent by weight Water | Percent by weight Oil | Polymer | Percent in emulsion | Polymer particle size range |
|---|---|---|---|---|---|
| I | 72 | 28(I) | 93% acrylamide / 7% methacrylic acid | 35 | 0.05-7.0 microns. |
| II | 72 | 28(I) | 93% acrylamide / 7% methacrylic acid | 35 | 0.05-7.0 microns. |
| III | 72 | 28(T) | 70% acrylamide / 30% acrylic acid | 35 | 0.05-7.0 microns |
| IV | 67 | 33(I) | 93% acrylamide / 7% methacrylic acid | 32 | <30 microns. |
| V | 70 | 30(I) | 70% acrylamide / 30% acrylic acid | 34 | .01-10 microns. |
| VI | 71 | 29(I) | Sodium polyacrylate | 37 | <1 mm. |

NOTE.—I=Isopar M. T=Toluene.

DISPERSION CONCENTRATE A

To emulsion in TABLE IV, COMPOSITION NUMBER VI, there was added 30 percent by weight of an aqueous dispersion containing 23 percent by weight of an alkylene polyamine prepared from the condensation of ethylene dichloride and ammonia. The polymer was prepared using the techniques set forth in Canadian Pat. No. 785,829.

DISPERSION CONCENTRATE B

To COMPOSITION NUMBER VI in TABLE IV, there was added an aqueous dispersion which contained 25 percent by weight of an ammonia ethylene dichloride polymer of the type used in DISPERSION A above, with the exception it had been quaternized with methyl chloride.

To illustrate other novel dispersion concentrates of the invention TABLE V is presented below:

TABLE V

| Dispersion | Anionic Latex Table IV | % by Weight | Cationic Polymer | % by Weight |
|---|---|---|---|---|
| C | I | 60 | 20% solution of a tetraethylene pentamine epichlorohydrin reaction product (Canadian Pat. 731,212) | 40 |
| D | VI | 50 | Ethylene diamine | 10 |
| E | V | 70 | 75 % acrylamide, 25 % dimethylamino ethyl methacrylate copolymer in the form of a latex (water-in-oil) — See TABLE II, U. S. 3,624,019 | 30 |

All of the above dispersion concentrates were stable and were capable of being stored under a variety of conditions without interreaction of the two polymers.

THE ORGANIC LIQUID

Generally, the dispersion concentrate will be diluted with an organic liquid just prior to use. As mentioned above, the preferred dispersion concentrate will have from 5 to 40 percent by weight of the two polymers. In this application, the dispersion concentrate will be diluted with the organic liquid so that the stable liquid dispersion will have 0.001 to 10 percent by weight of the two polymers.

The dispersion concentrate can be diluted with the organic liquid (including crude oil) near the location of the well where it is to be used. This on-site dilution procedure may be performed in a mixing tank near the well location and then be pumped directly into the well. The organic liquids of this invention include both aromatic and aliphatic hydrocarbon compounds. Thus, such organic hydrocarbon liquids as benzene, xylene, toluene, mineral oils, kerosene, naphthas and petroleums may be used. In particular, the petroleum recovered from the primary recovery operation (crude oil) may be used to dilute the dispersion concentrate for use. The use of petroleum obtained from the primary recovery operation eliminates the burdensome problems in handling other organic liquids but also results in a great decrease in cost.

Oftentimes it is desirable to use a more concentrated flooding medium than the ones as defined above. If such is the case, the dispersion concentrate may be used without dilution with an organic liquid. If such is the case the polymeric latex concentrate would be pumped directly into the well without any type of dilution.

INVERSIONS OF THE STABLE LIQUID DISPERSION

One of the most interesting phenomenon that occurs in working with the above described anionic latices is the fact that under certain conditions the emulsion, which contains dispersed therein the finely divided water-soluble anionic vinyl addition polymers, may be inverted.

The water-soluble anionic vinyl addition polymer-containing emulsions may be inverted by any number of means. The most convenient resides in the use of a surfactant.

The surfactant may be combined with the stable liquid dispersion by several different techniques. It may be added and mixed with the stable liquid dispersion just prior to being pumped into the subterranean formation. The placement of a surfactant into the stable liquid dispersion causes it to more rapidly invert and release the polymer and form the gel-like structure. When this technique is used to invert the flooding medium the amount of surfactant present in the water may vary over a range of from 0.01 to 10 percent based on polymer.

Secondly, the surfactant may be introduced as a solution into the subterranean formation prior to the injection of the stable liquid dispersion. The surfactant may be diluted with a brine which was recovered and separated from primary recovery processes. This brine solution is readily available at little or no cost. The surfactant is added to the brine solution in a concentration of from 0.5 to 5.0 percent by weight. When the crude oil containing the stable liquid dispersion is contacted with the brine containing surfactant in the subterranean formation the emulsion is inverted and the anionic vinyl addition polymer instantly reacts with the cationic polymer to produce a gel-like structure. The rate at which this occurs may be controlled by the type and amount of emulsifier used to prepare the polymer system. The polymer-containing emulsions release the polymer in water after a period of time in such a manner as to avoid the dissolution problem of the prior art. Thus, when the water-in-oil emulsion is pumped into an input well it will mix with water in the subterranean formation at which time the polymer will be released forming a gel-like structure.

It is preferred that once the crude oil containing the emulsion is introduced into the formation that the emulsion be left static for from 5 to 72 hours. This period of time has been found to be sufficient to completely invert the emulsion and release the water-soluble vinyl addition polymer into solution. As mentioned above, this time may vary with the composition as well as the rock formation. Thus, it is possible for complete dissolution to occur either more rapidly or more slowly than the preferred time range. It should be stressed that the invention is not limited by the amount of time necessary to dissolve the polymer.

The process comprises the following steps:

A. Introducing a brine solution containing from 0.5 to 5.0 percent by weight of a surfactant into an input well which penetrates said formation; then, B. Introducing a stable liquid dispersion into said input well which penetrates said formation, and allowing the stable liquid dispersion to be left static for from 5 to 72 hours; said dispersion containing:

1. a polymeric latex composed of a water-in-oil emulsion which contains dispersed therein a finely divided water-soluble anionic vinyl addition polymer, said polymeric latex having uniformly distributed therethroughout; and 2. a water-soluble cationic polymer:

with the weight ratio of A:B being within the range of 1:10 to 10:1 and the total amount of A+B present within said dispersion being within the range of from 0.001 percent to 75 percent by weight, then forcing said dispersion through said formation toward at least one producing well penetrating said formation at a distance from said input well.

Thirdly, the stable liquid dispersion may be injected into the subterranean formation, followed by the injection of the brine solution containing the surfactant.

The preferred surfactants are hydrophilic and are further characterized as being water soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic or nonionic compound can be used as the surfactant.

In addition to using the water soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

The emulsions may be inverted by treating them with aqueous solutions of alkaline materials such as solutions of sodium hydroxide, ammonia, amines, sodium aluminate or the like.

Other techniques for inverting the emulsions include the use of agitation, high voltage electrical fields, heat and pH shift, as well as the placement into the water, into which the polymer-containing emulsion is to be dissolved, certain electrolytes. For any particular polymer-containing emulsion a suitable method for its inversion may be readily determined by routine experimentation.

THE GEL-LIKE STRUCTURES

When the stable liquid dispersions are thus inverted the anionic vinyl addition polymer instantly reacts with the cationic polymer to produce within a matter of minutes a reaction product which may be described as a three-dimensional, water and hydrocarbon liquid insoluble gel-like structure, which is composed of what is believed to be ionically combined intimate admixture of the two polymers. These gel-like structures are spongy, porous, and are substantially incapable of adherence to most hydrophobic surfaces.

EXAMPLES

When the stable liquid dispersions are injected into input wells they have a high water-to-oil output ratio, generally resulting from many years of secondary recovery operations, it is possible to greatly improve the amount of oil produced in relation to the water recovered.

For instance, when the stable liquid dispersions would be used to treat typical produced fluid from, for instance a West Texas water flooding field, improvements in the amount of oil produced will range from between 20 to as high as 40 percent by weight.

Specifically, when the stable liquid dispersions of the invention are used typical results that would be obtained are set forth in Table VI below. Typical of the dilutions used are injection fluid which is composed of 97 percent crude oil, 4 percent water, 1 percent polymer.

The results shown in Table VI would be obtained on dispersion concentrates A through E, as described above, after continuous injection would be made into the producing wells over a 1 to 5 week period.

TABLE VI

| Ex. No. | Dispersion Concentrate | % Concentrate by weight | Organic Liquid | % Organic Liquid by Weight | % Increase in oil compared to dry Polymer |
|---|---|---|---|---|---|
| 1 | A | 5 | Crude Oil | 95 | 35 |
| 2 | B | 10 | Crude Oil | 90 | 20 |
| 3 | C | 3 | Crude Oil | 97 | 21 |
| 4 | D | 5 | Crude Oil | 95 | 40 |
| 5 | E | 5 | Crude Oil | 95 | 38 |

I claim:

1. A process for recovering oil from a subterranean oil-bearing formation which comprises introducing a stable liquid dispersion of a water-soluble anionic vinyl addition polymer and a water-soluble cationic polymer in the presence of a water-soluble surfactant into an input well penetrating said formation and forcing said stable liquid dispersion through said formation and toward at least one producing well penetrating said formation at a distance from said input well, and said dispersion is inverted by means of a surfactant, said stable liquid dispersion comprising:

A. a polymeric latex composed of a water-in-oil emulsion which contains dispersed therein a finely-divided water-soluble anionic vinyl addition polymer;

B. said pOlymeric latex having uniformly dispersed therethroughout a water-soluble cationic polymer; with a weight ratio of A:B being within the range of 1:10 to 10:1 and total amount of A+B present within said dispersion being within the range of from 0.001 percent to 75 percent by weight.

2. A process for recovering oil from a subterranean oil-bearing formation which comprises introducing a stable liquid dispersion of a water-soluble anionic vinyl addition polymer and a water-soluble cationic polymer in the presence of a water-soluble surfactant into an input well penetrating said formation and forcing said stable liquid dispersion through said formation and toward at least one producing well penetrating said formation at a distance from said input well, said stable liquid dispersion comprising:

A. a polymeric latex composed of a water-in-oil emulsion which contains dispersed therein a finely divided water-soluble anionic vinyl addition polymer;

B. said polymeric latex having uniformly dispersed therethroughout a water-soluble cationic polymer; with a weight ratio of A:B being within the range of 1:10 to 10:1 and total amount of A+B present within said dispersion being within the range from 0.001 percent to 75 percent by weight.

3. The process of claim 1 where the stable liquid dispersion is comprised of:

A. a polymeric latex composed of a water-in-oil emulsion which contains dispersed therein a finely divided polyacrylic acid or a water-soluble salt thereof;

B. said polymeric latex having uniformly dispersed therethrough a water-soluble alkylene polyamine polymer; with a weight ratio of A:B being within the range of 1:10 to 10:1 and the total of A+B present within said dispersion being within the range of from 0.001 percent to 75 percent by weight.

4. The process of claim 1 where the water-soluble anionic polymer is polyacrylic acid or its water-soluble salts and the water-soluble cationic polymer is an alkylene polyamine polymer.

5. The process of claim 1 wherein the stable liquid dispersion has a weight ratio of A:B within the range of from 1:5 to 5:1 and the amount of A+B present within said dispersion is within the range of 5 percent to 40 percent by weight.

6. The process of claim 1 wherein the stable liquid dispersion has a weight ratio of A:B within the range of from 1:2 to 2:1 and the amount of A+B present within said dispersion is within the range of from 10 percent to 30 percent by weight.

7. A process for recovering oil from a subterranean oil-bearing formation which comprises the following steps:

A. introducing a brine solution containing from 0.5 to 5.0 percent by weight of a surfactant into an input well which penetrates said formation; then, B. introducing a stable liquid dispersion into said input well which penetrates sAid formation and allowing the stable liquid dispersion to be left static for from 5 to 72 hours; said dispersion comprising:

1. a polymeric latex composed of a water-in-oil emulsion which contains dispersed therein a finely divided water-soluble anionic vinyl addition polymer;

2. said polymeric latex having uniformly dispersed therethroughout a water-soluble cationic polymer; with a weight ratio of A:B being within the range of 1:10 to 10:1 and total amount of A+B present within said dispersion being within the range of from 0.001 percent to 75 percent by weight.

* * * * *